(12) United States Patent
Fernstrom et al.

(10) Patent No.: US 8,117,617 B2
(45) Date of Patent: Feb. 14, 2012

(54) ENERGY-AWARE PRINT JOB MANAGEMENT

(75) Inventors: Christer E. Fernstrom, St Ismier (FR); Christophe P. Mitenne, Fontenay les Briis (FR)

(73) Assignee: Xerox Corporation, Norwalk, CT (US)

( * ) Notice: Subject to any disclaimer, the term of this patent is extended or adjusted under 35 U.S.C. 154(b) by 1114 days.

(21) Appl. No.: 11/944,761

(22) Filed: Nov. 26, 2007

(65) Prior Publication Data

US 2009/0138878 A1     May 28, 2009

(51) Int. Cl.
  G06F 9/46    (2006.01)
  G06F 3/12    (2006.01)
  G06F 11/00   (2006.01)

(52) U.S. Cl. ............ 718/102; 358/1.15; 400/61
(58) Field of Classification Search .......... None
  See application file for complete search history.

(56) References Cited

U.S. PATENT DOCUMENTS

| | | | |
|---|---|---|---|
| 6,883,980 B2* | 4/2005 | Guddanti | 400/61 |
| 6,916,127 B2* | 7/2005 | Wanda | 400/61 |
| 7,072,066 B2 | 7/2006 | Guddanti | |
| 7,190,477 B2* | 3/2007 | Ferlitsch | 358/1.15 |
| 7,656,547 B2* | 2/2010 | Kuo et al. | 358/1.15 |
| 2004/0083186 A1 | 4/2004 | Castellani et al. | |
| 2004/0083187 A1 | 4/2004 | Andreoli et al. | |
| 2004/0095599 A1 | 5/2004 | Guddanti | |
| 2005/0108036 A1 | 5/2005 | Andreoli et al. | |
| 2006/0039026 A1 | 2/2006 | Lofthus et al. | |
| 2006/0206445 A1 | 9/2006 | Andreoli et al. | |

* cited by examiner

*Primary Examiner* — Meng An
*Assistant Examiner* — Bing Zhao
(74) *Attorney, Agent, or Firm* — Fay Sharpe LLP (57) ABSTRACT

A printing system and method for processing print jobs in a network of printers are disclosed. The printers each have high and low operational states. A job ticket is associated with each print job. The job ticket designates one of the network printers as a target printer for printing the job and includes print job parameters related to redirection and delay for the print job. Where the target printer for the print job is in the low operational state, the print job related redirection and delay parameters for the job are identified. Based on the identified parameters, the print job may be scheduled for at least one of redirection and delay, where the parameters for redirection/delay permit, whereby the likelihood that the print job is printed sequentially with another print job on one of the network printers, without that one printer entering an intervening low operational state, is increased.

21 Claims, 5 Drawing Sheets

ENERGY-AWARE PRINT JOB MANAGEMENT

BACKGROUND

The exemplary embodiment relates to the management of print jobs in a manner which enables a reduction in overall energy consumption. It finds particular application in conjunction with a network printing system in which multiple shared printers are available for printing print jobs and will be described with particular reference thereto.

Network printing systems, in which print jobs can be selectively directed from a workstation to one of a group of shared devices, are now common. The network devices are typically printers or multifunction devices (MFDs), such as those with printing, copying and optionally faxing and email capability, all of which will be referred to as printers. A device typically receives an incoming print job and places it in a queue with other print jobs and then prints them in order. Since demands for printing vary over time, the devices typically have two or more modes in which the printer is either capable of printing or capable of being automatically raised to a mode in which it is capable of printing. A printer may thus have at least two modes including a ready mode, in which the device is ready for printing, and a stand-by or automatic power saving mode. Generally, when the printer has been idle for a certain period of time, it automatically goes into the stand-by mode, with reduced power consumption.

For certain printers, the difference in power consumption between stand-by and ready modes is significant. For example, in the case of printers using solid ink technology, the ink is melted to convert it from a solid to a liquid prior to printing. In the ready mode, the ink is maintained at an increased temperature level, resulting in higher power consumption. The warm-up from stand-by to ready mode involves significant energy consumption to melt the solid ink and also consumes ink to clean the print heads. Once the warm-up has been completed, the printer is ready for operation and starts printing (generally, after a quick transition through an idle state). When printing ends, the printer enters the idle state, where in the case of solid ink printers, the ink is maintained in liquid form. If no new print job is submitted to the printer, it will eventually return to its stand-by mode. In periods of infrequent usage, printers may go through numerous cycles like these, possibly one for every print job.

The wake-up process can be quite lengthy. Some printer models provide different levels of "readiness" to maintain an acceptable balance between power consumption and wake-up time, and in some cases they provide self-adaptive power-mode management by measuring the daily periods when printers are typically being used, in order to anticipate the wake-up and the transition to ready mode.

Typically, the handling of office print jobs aims to execute jobs immediately: jobs are added to the printer's print queue and sent to the printer if the printer is in a ready mode or warming-up state. If the printer is in the stand-by mode, a command is sent to wake it up. In a situation where the printer is infrequently used, this may result in many daily wake-ups and periods when the printer is idle in the ready mode (i.e., the time following the execution of a print job when the printer remains in ready mode, "hoping" to receive new jobs). This form of "eager" printing has the advantage that latency for users is minimal: a requested print job is executed as soon as possible. In many cases, this may be the optimal behavior, but there are also many situations where users may be willing to accept a later printing, if this could lead to reduced consumption of power and/or consumables (e.g., ink, paper), and hence cost. For example, printing frequently occurs to prepare off-line reading, off-site working, meeting materials, and the like.

As organizations move to electronic, largely paperless systems, print jobs are more likely to be generated on an individual user basis, rather than centralized printing in bulk, as was the case in the traditional print-and-distribute model. The resulting distributed printing of a large number of smaller print jobs typically increases the number of times in a day that a printer switches operational modes.

There remains a need for print job management systems which are able to manage the power states of printers more efficiently.

INCORPORATION BY REFERENCE

U.S. Pat. No. 7,072,066, issued Jul. 4, 2006, entitled SYSTEM AND METHOD FOR SAVING POWER USING PRIORITY PRINTING, by Guddanti, discloses a method and apparatus for saving power in a printing system, by prioritizing printer jobs. Using a graphical user interface, an end-user assigns a print time to a first job. The print time designation is attached to the first job and the first job is transmitted from the end-user station to a printer. Based on whether the printer is in ready mode or in power save mode, the first job is printed immediately or stored in memory. When the first job is stored in memory, computations are made to determine a printing time to initiate printing of the first job. The first job is then printed at the printing time or at an earlier printing time if a second job with an earlier printing time is stored in the memory.

U.S. Pub. No. 2006/0039026, published Feb. 23, 2006, entitled PRINT SEQUENCE SCHEDULING FOR RELIABILITY, by Lofthus, et al., discloses a method for scheduling print jobs for a plurality of printers which includes, for each of a plurality of print jobs, determining a number of pages of a first print modality (such as black only printing) and of a second print modality (such as color printing) for the print job. A file header is determined, based on the number of pages of the first and second print modalities in the print job. The file header is associated with the print job and the print job transmitted, along with the file header, to a print job scheduler. The scheduler schedules a sequence for printing the plurality of print jobs by the plurality of printers, based on minimizing, for at least one of the plurality of printers, a number of periods of time during the sequence of printing where the at least one printer is in a non-operational mode, and/or maximizing continuous run time for at least one of the printers.

BRIEF DESCRIPTION

In accordance with one aspect of the exemplary embodiment, a method for processing print jobs in a network of printers is provided. Each of a plurality of the printers has a high operational state and a low operational state, in which the printer is less ready for printing than in the high operational state. The method includes, for each of a plurality of print jobs, receiving a print job to be printed. A job ticket is associated with the print job. The job ticket designates one of the printers in the network of printers as a target printer for printing the print job and print job parameters related to redirection and delay for the print job. Where the target printer for the print job is in the low operational state, the method includes identifying the print job parameters related to redirection and delay for the print job from the job ticket and based on the identified parameters, scheduling the print job for at least one of redirection to a redirection printer in the network of printers, where the parameters for redirection permit redirection, and delay of the print job where the parameters for delay permit a delay, whereby the likelihood that the print job is printed sequentially with another print job on one of the target printer and redirection printer without that one printer entering an intervening low operational state is increased.

In another aspect, a method of generating a job ticket for a print job to be printed includes providing an option for a user to select at least one print job delay parameter which permits delay of an associated print job and providing an option for a user to select at least one redirection parameter which permits redirection of the print job. Any user selected print job delay and print job redirection parameters are incorporated into a job ticket for the print job whereby a printing system is permitted to delay or redirect the print job in accordance with the selected parameters.

In accordance with another aspect, a printing system includes a plurality of printers. A print manager receives print jobs, a job ticket being associated with each print job. Where a target printer designated for printing a print job is in a stand-by mode, the print manager identifies parameters related to redirection and delay for the print job from the job ticket. Based on the identified parameters, the print manager schedules the print job for at least one of a) redirection to a redirection printer in the network of printers, where the parameters for redirection permit redirection, and b) delay of the print job where the parameters for delay permit a delay, whereby the likelihood that the print job is printed sequentially with another print job on one of the target printer and redirection printer without that one printer entering an intervening low operational state is increased.

DETAILED DESCRIPTION

The term "device" or "printer," as used herein, broadly encompasses various printers, copiers, bookmaking machines, or multifunction machines, xerographic or otherwise, unless otherwise defined, which performs a print job rendering function for any purpose.

A "network printing system," as used herein incorporates a plurality of shared devices, which are accessible to one or more workstations, such as personal computers.

The term "print medium" generally refers to a physical sheet of paper, plastic, or other suitable physical print media substrate for images, whether precut or web fed.

A "print job" generally includes a "printing object," which consists of one or more document images in a suitable format that is recognized by the printer, e.g., Postscript, together with a "job ticket," which provides information about the print job that will be used to control how the job is processed. A typical processed print job may comprise a set of related sheets printed as one more collated copy sets copied from a set of original print job sheets or electronic document page images, from a particular user, or which are otherwise related. Where reference is made herein to processing operations related to the print job, such as storing, receiving, sending, etc., of a print job, this generally includes processing operations involving one or more of the printing object, its job ticket, information derived from the printing object and/or information derived from the job ticket, unless otherwise indicated.

In the exemplary embodiment, in addition to information about the print medium to be used, number of copies, image properties, such as scaling, one or two sided printing, and so forth, the job ticket provides for input of information which permits print job delay and redirection. One purpose of this information is to control if and how jobs are delayed and re-directed, and, if appropriate, initiate a dialogue with the originating user to fine tune or override the operations. In particular the job ticket includes information on printing parameters regarding delay or redirection that have been selected (either by an originating user, by the system, or by default) and any dialogue requirements related to the selection default or redirection that have been selected (either by an originating user, by the system, or by default).

In general, a print job delay is one which entails a delay in printing which is greater than would occur if the print job were to be simply placed in the queue of the target printer (the printer designated for printing by the job ticket) and printed in the normal course of printing. A printing delay which is a result of a conventional first in first out (FIFO) printing protocol of the target printer is thus not considered a print job delay for purposes of this disclosure.

In general, a print job redirection involves redirecting a print job, or at least a part thereof, from the target printer to another printer (a redirection printer) in the printing network printing system which has not been designated as the target printer.

Figure 1:
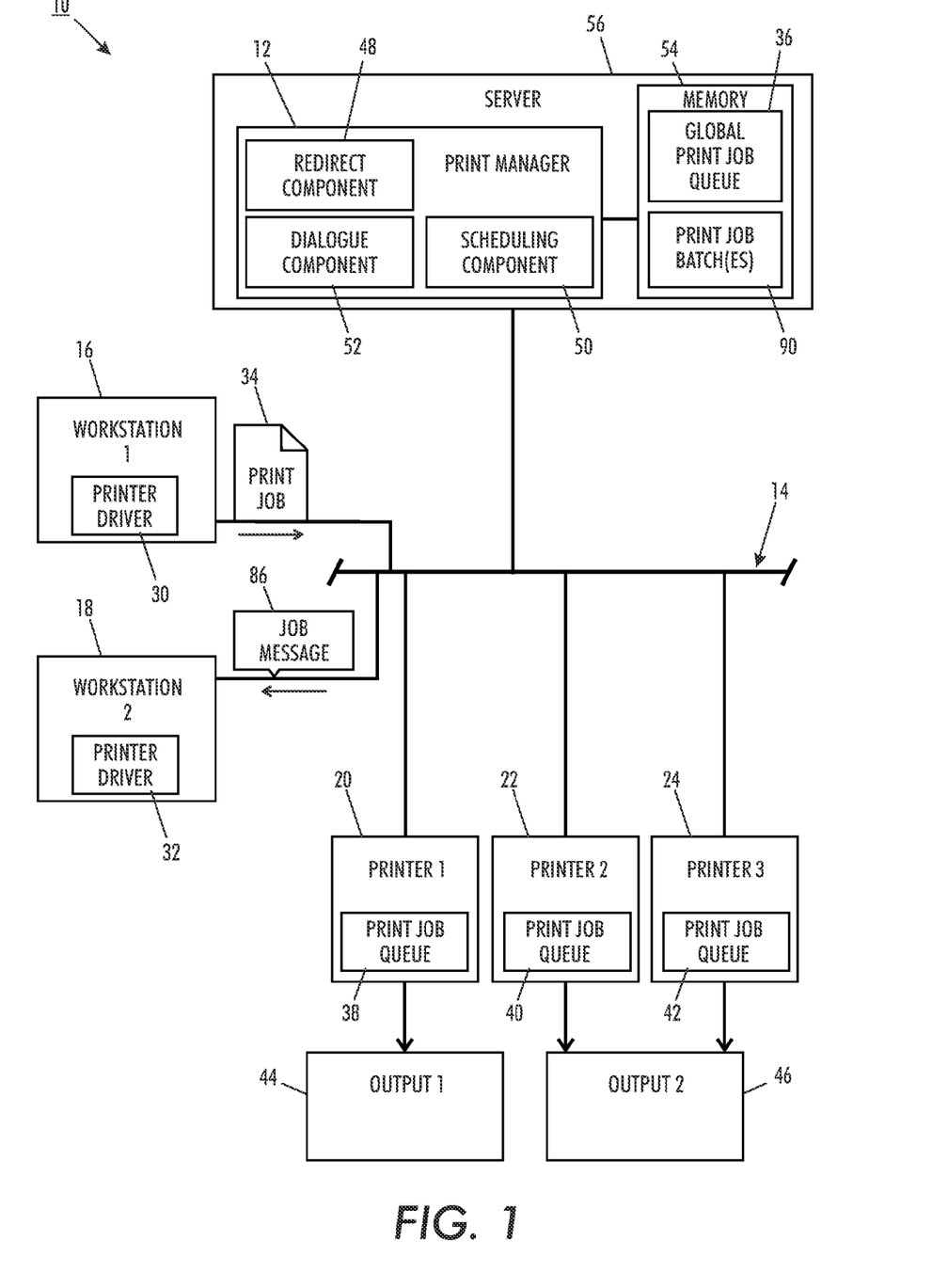
FIG. 1 is a schematic diagram of an environment in which an exemplary print job management system operates in accordance with one aspect of the exemplary embodiment.

With reference to FIG. 1, an exemplary network printing system 10 includes a print manager 12, which is communicatively linked by a network 14 to one or more workstations, here illustrated as first and second workstations 16 and 18, and to a plurality of shared printers, here illustrated as first, second, and third printers 20, 22, 24, although fewer or more networked workstations and/or shared printers may be provided. Each workstation 16, 18 is associated with a respective printer driver 30, 32, which generates print jobs 34. Print jobs 34 are received by the print manager 12, via the network 14. The print jobs arriving from the plurality of workstations 16, 18 are all placed in a global print queue 36. The global print job queue 36 may thus at any given time, be storing print jobs 34 targeted for multiple printers 20, 22, 24 in the network 14. The print jobs 34 are processed by the print manager 12 in accordance with their job tickets and sent to one or more of the printers 20, 22, 24 for printing. The printers 20, 22, 24 place the print jobs 34 in their respective print queues 38, 40, 42. The printers 20, 22, 24 render the print jobs 34 on print media and output the printed media to one or more output devices, such as finishers, trays, or the like, here illustrated as outputs 44, 46.

The exemplary print manager 12 includes a redirection component 48, a scheduling component 50, and a dialogue component 52 and accesses a memory 54 which stores the global print job queue 36. As shown in FIG. 1, the print manager 12 and memory 54 may be hosted by a server 56, which is linked to the network 14. Alternatively, the print manager 12 and/or global print queue 36 may be resident elsewhere in the network, such as in one of the workstations 16, 18 or printers 20, 22, 24, or on any suitable computing device communicatively linked to the network 14.

The exemplary system 10 is operative to provide a combination of methods to reduce unnecessary printer wake-ups and idle periods. The system does so by a combination of delaying, re-ordering and/or re-routing of print jobs 34. Print jobs 34 are managed by the print manager 12 from the global print queue 36 which, in the illustrated embodiment, holds all pending print jobs for all printers in the network prior to their being sent to the various printers. In other embodiments, where the print manager 12 controls print jobs for only a subset of the printers on the network, the global print queue 36 may hold only the pending print jobs for the subset of printers. The organization of individual print jobs within the queue 36 can be controlled by global policies and default rules, for example rules stipulating that the initial order of jobs in the queue must be maintained so that jobs are executed in the same order they are received, or alternatively that jobs should be grouped according to user, to job size, and/or according to other properties, such as paper quality and for size.

In the exemplary embodiment, the print manager 12 is aware of the current mode of each of the linked printers 20, 22, 24 (e.g., whether it is in a ready mode, a warm-up mode, or a stand-by mode). In one embodiment, information relating to the current mode of each networked printer 20, 22, 24 is stored in memory 54. Periodically, the scheduling component 50 of the print manager 12 queries the printers 20, 22, 24 to determine their respective current modes and updates the stored information accordingly. Based on the print jobs 34 in the global queue 36, the printing parameters of the associated job tickets, and the operational states of the printers 20, 22, 24, the scheduling component 50 determines an appropriate printing action for each the stored print jobs 34, such as whether to maintain a particular print job 34 in the global queue 36, thereby delaying printing, whether to send the print job 34 to the printer 20, 22, or 24 designated by the job ticket for printing (target printer), or whether to redirect the print job to another of printers 20, 22, 24 (redirect printer). Where permitted, the print manager 12 may generate a batch of print jobs 34 for sending to a single one of the printers 20, 22, or 24 at a time which allows the print jobs 34 to be printed by that printer in compliance with the selected job ticket printing parameters of the print jobs 34 in the batch. The batch is created to allow the printer 20, 22, or 24 to print the jobs in a sequence which aims to maximize the time which the printer 20, 22, 24 is maintained in the ready mode and/or reduce the number of times that printer (or the networked printers as a group) cycles into the stand-by mode. The batch may be generated in accordance with one or more of the print manager 12's batch generation policies, such as maintaining print jobs 34 from a given user in the same batch. Each batch may, at any one time, include one or more print jobs 34.

As will be appreciated, the global print queue 36 is frequently updated with additional print jobs 34. The printing parameters of a newly arriving print job 34 may cause the print manager 12 to change the designations of print jobs 34 already stored in the global queue 36. For example, if the new print job 34 does not permit redirection or delay, the print job 34 will be sent immediately to the print queue of the designated printer, causing that printer to be brought to the ready mode, if it is currently in the stand-by mode. Knowing that the target printer has been forced to change modes, the print manager 12 may send delayed print jobs 34 in the global queue 36 to that printer 20, 22, or 24 for printing in sequence with the new print job 34, provided that to do so is in compliance with the printing parameters of the respective job tickets of the delayed print jobs. When a batch has been created, these may be sent to the same device 20, 22, or 24.

The optional redirection component 48 creates a calculated set of potential redirection printers from those available in the networked system, based on stored information about prior print jobs. Techniques for mining data on prior print jobs and identifying target printers for redirection are disclosed, for example, in U.S. application Ser. No. 11/137,565, filed May 26, 2005 (U.S. Pub. No. 2006-0206445), by Andreoli, et al, entitled PROBABILISTIC MODELING OF SHARED DEVICE USAGE, the disclosure of which is incorporated herein by reference in its entirety, and may be made available, for example, using Xerox's Print Infrastructure Mining (X-PIM) technology. The redirection component 48 may identify from prior print jobs, for example, a redirection printer that has been frequently, or previously used by the originating user and, absent a user's section of another redirection printer, set the identified redirection printer as a default redirection printer for a job in which redirection is permitted.

The dialogue component 52 communicates with the originating user in accordance with any dialogue requirements in the job ticket. The job ticket may identify one or more dialog-related selected option, such as: a) a method for notification of delay (e.g., email, dialogue box, or the like), b) a notification period (how long the job can be delayed before the originating user is notified), and c) whether the user is to have an option to communicate with the dialogue component, such as to respond to the notification or request a change (e.g., to reject a delay, request that a delay be suspended or reduced, reject a redirection, or the like). When a print job 34 is to be delayed or redirected, the dialogue component 52 initiates a dialogue with the user in accordance with the dialogue options selected (by a user or by default).

The exemplary print manager 12 may be hosted by one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, or PAL, or the like. In general, any device, capable of implementing a finite state machine that is in turn capable of implementing the flowchart shown in FIG. 3, can be used to host the print manager.

The network 14 may be in the form of wired or wireless links or other means capable of supplying or communicating electronic data to and/or from the connected/linked elements. For example, the links between elements can be telephone lines, computer cables, ISDN lines, wireless communication links (e.g., employing Bluetooth™ wireless technology), or the like.

Printers 20, 22, 24 may be electrophotographic printers ink-jet printers, solid ink printers, thermal head printers used in conjunction with heat sensitive paper, or combinations or multiples thereof, or any other device capable of marking an image on a substrate. In general a printer 20, 22, 24 includes an image rendering component, which applies marking materials, such as inks or toners, to print media, and optionally a fixing component, which fixes the applied marking materials more permanently to the print media.

In the case of a xerographic printer, employing hardware elements employed in the creation of desired images by electrophotographical processes, the components may include a charge retentive surface member, such as rotating photoreceptor in the form of a belt or drum. Disposed about the photoreceptor are various xerographic subsystems, typically including a cleaning station, a charging station, an exposure station, which forms a latent image on the photoreceptor, a developer station for developing the latent image by applying a toner thereto to form a toner image, a transferring unit, such as a transfer corotron, which transfers the toner image thus formed to the print media, and a fuser, which fuses the transferred image to the print media. In the case of an inkjet printer, such as a solid ink printer, the printer may include one or more ink reservoirs. Ink is delivered from the reservoir(s) to ink jets which expel droplet of the ink onto the print medium, either directly or via an intermediate transfer member, such as a rotating drum. The printer may further include an input/output interface, a memory, a marking cartridge platform, a marking driver, a function switch, sensors, a controller, and a self-diagnostic unit, all of which can be interconnected by a data/control bus.

Each of the exemplary printers 20, 22, 24 may be considered to exist in any one of a plurality of modes at any one time. For example, each printer 20, 22, 24 may have a stand-by (power-saving) mode, a warm-up mode, and a ready mode. In the stand-by mode, the printer 20, 22, 24 is not capable of printing and needs to go through the warm up-mode before it can print a print job. In the ready mode, the printer 20, 22, 24 may be either idle or printing. As will be appreciated, the printer 20, 22, 24 may have more modes than these or may have more than one level of the stand-by or warm-up modes, e.g., depending on how long the printer has been inactive. For convenience, each printer 20, 22, 24 may be considered to have at least two operational states, including a high operational state, e.g., when it is a ready mode or warm up mode, and a low operational state, i.e., lower than the high operational state, e.g., where it is in a stand-by mode. The high operational state is one in which the printer is either ready for printing or at least more ready than in the low operational state, for example less energy is required to be input to the printer for printing to commence in the high operational state than in the low operational state. In the low operational state, the printer can be automatically brought to the high operational state, e.g. by placing it in the warm-up mode.

The printing system may incorporate "tandem engine" printers, "parallel" printers, "cluster printing," "output merger" or "interposer" systems, and the like, as disclosed, for example, in U.S. Pat. Nos. 5,568,246; 4,587,532; 5,570,172; 5,596,416; 5,995,721; 4,579,446; 6,654,136, incorporated by reference. The printers in the network may be cluster printers, each with its own output device 44 or two or more printers 22, 24 may be linked to a common output device, such as device 46. Each of the printers 20, 22, 24 may be associated with a source of print media, such as a paper feeder (not shown), which may include one or more print media supply trays, each tray holding sheets of print media of a different type.

The workstations 16, 18 can be any device capable of communicating with the print manager 12 over the network 14. For example, the workstations 16, 18 can be personal computers, wherein each workstation 16, 18 includes an input/output interface for communicating with the network 14, a controller or CPU, a memory, a display, such as an LCD screen, and a user input device, such as a keyboard, key pad touch screen, cursor control device, or combination thereof. Alternatively, workstations 16, 18 can be other types of devices capable of communicating with the network. For example one or more of the workstations may be a PDA, mobile phone, or any other suitable device connected to the network 14. Each workstation 16, 18 may be configured for designating any one of the printers 20, 22, 24 as its default target printer and one or more additional printers as alternate redirect printers. In other embodiments, each workstation 16, 18 may be limited to selecting the target and/or alternate printers from a limited group (fewer than all) of the networked printers.

The exemplary printer drivers 30, 32 may be in the form of software, hardware or both. Typically, the printer driver 30, 32 is in the form of software that serves as the communication link between applications operating on the workstation 16, 18 and the page-description language used by the printers 20, 22, 24. The printer driver 30, 32 enables the workstation 16, 18 to communicate with the print manager 12, including submitting information to be printed. An operating system for the workstation 16, 18 can be a conventional operating system such as for example, Windows, Linux, or Mac OS, which may coordinate usage of a single printer driver for all applications. Alternatively, each application which runs on the workstation 16, 18 may include its own printer driver. As will be appreciated, one or more applications and/or one or more printer drivers 30, 32 usable by the workstation 16, 18 can reside in locations other than the workstation's memory, such as on some other device connected to the network 14 (e.g., a remote server). For example, applications or printer drivers 30, 32 can be Internet or web-based.

In one embodiment, the printer driver 30, 32 executes instructions, stored in the personal computer's memory, for generating a print job ticket in accordance with default and/or user-selected parameters including parameters for print job delay and redirection. An exemplary print job ticket may include some or all of the following parameters, as default parameters and/or as user selectable options.

Job Settings: Page format and printer setting information (paper size and orientation, quality, page range, etc.).

Originator: Identity of the person who is the job originator (e.g., the person's name or IP address of the workstation 16, 18).

Dialogue Handle: A handle that will make it possible to establish a dialogue with the user, e.g., via the print client on the originator's workstation. For example, if the dialogue is to be by email, the handle may simply be the originator's email address. For interaction with the user via an application window which pops up, other types of handle may allow interaction with the user's workstation.

Email address of the originator: allows dialogue via email with the originator.

Time of submission: allows calculation of delay times.

Target printer: the printer selected (either by user or by default) for executing the print job 34.

Job Modification Allowance: indicates if the job may be delayed, re-directed or both, and if so which is the preferred action (delay or redirect).

Job Modification Automation: indicates to what level allowed job modifications can be performed automatically or only with the agreement of the originator.

Delay Restriction: time for latest execution if delay is permitted. May be an absolute time or relative to the submission time.

Redirection Restriction: indicates any restrictions on redirection of the job, such as which of the network printers are acceptable as potential redirection printers (printer(s) to which the print job 34 may be directed if the target printer is in stand-by mode).

Interaction Interval: Specifies the time interval for when the print manager 12 will trigger an interaction with the user in the case the job is delayed.

Figure 3:
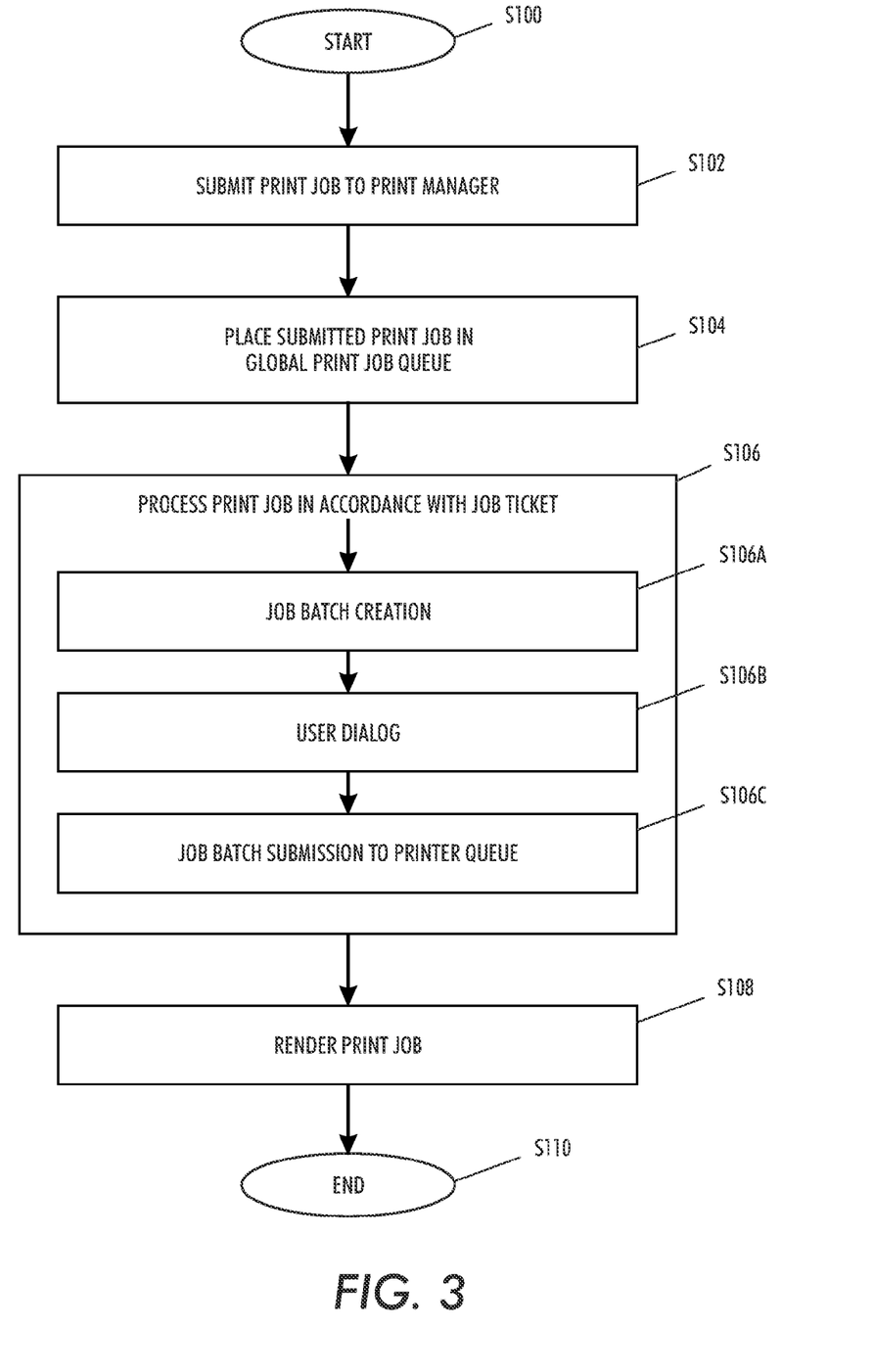
FIG. 3 is a flow diagram illustrating an exemplary method of managing a print queue in accordance with another aspect of the exemplary embodiment.

These parameters may be displayed to a user via a graphical user interface 58 hosted by the workstation, 16, 18, as illustrated in FIG. 3. For example, when the user selects the "Print" button in an application, the GUI displays a pop-up menu on the screen. The user interacts with the menu via the keyboard, keypad, touch screen, mouse, or the like. One portion 62 of the menu shows various selectable job settings, such as paper size, number of copies, etc. A region 64 related to job modification parameters displays a user name box 66. A user email input box 68 may display the user's email by default and may allow a user to specify an alternative email. A delay permission input box 70 allows a user to accept a delay in printing. If the user selects this (either as a default setting or clicking on the box) further selectable options are displayed in a new window 72, here illustrated as a maximum delay input box 74, a latest printing time box 76 and a specified printing time box 78. A user may select from the various time options these boxes provide. A redirect permission input box 80 allows a user to accept a redirect from the target printer e.g., printer 20, to an alternate printer, e.g., printer 22 and/or 24. Here the user has selected not to allow redirection, but if redirection is permitted (either by default or by clicking the box), a further window with further selectable options may be displayed, such as a list of printers from which the user can select acceptable printers for the redirection. If a user accepts both redirection and delay, a user preference box 82 may be displayed which allows a user to select which of the two options (redirection or delay) is preferred. Notification parameters, such as the maximum time within which a notification of a redirection or delay is provided to the user, are entered in a box 84. Further details of some of these parameters are provided below. As will be appreciated, menu 60 is exemplary only.

The printer driver 30, 32 causes the set of processing instructions to be associated with the image or images to be printed, thereby creating a print job corresponding to the print object to be printed. The printer driver 30, 32 then communicates the print job 34 to the print manager 12.

The print manager 12 receives print jobs 34 as they are generated by the workstation(s) 16, 18 and places them in the global print job queue 36. The scheduling component 50 schedules printing of the print jobs 34 in accordance with the job ticket parameters and one or more policies for delaying, reordering, and/or redirecting print jobs. The policies are designed to factor in to the scheduling decision resource-related considerations, such as reducing power consumption, wastage of materials, and wear and tear on components, where these can be achieved within the constraints provided by the print job parameters. In particular, the policies aim to reduce the number of times a particular device cycles between the ready mode and the power-saving mode. These may be achieved by one or more of:

1. Redirecting a print job 34 from a designated (target) printer, when that printer is in a power-saving mode, to an alternative printer, which is in a ready or warm-up mode.

2. Delaying one or more print jobs 34 for printing as a batch.

3. Reordering print jobs, such that a print job 34 is printed before one which arrives earlier in the queue 36.

Figure 2:
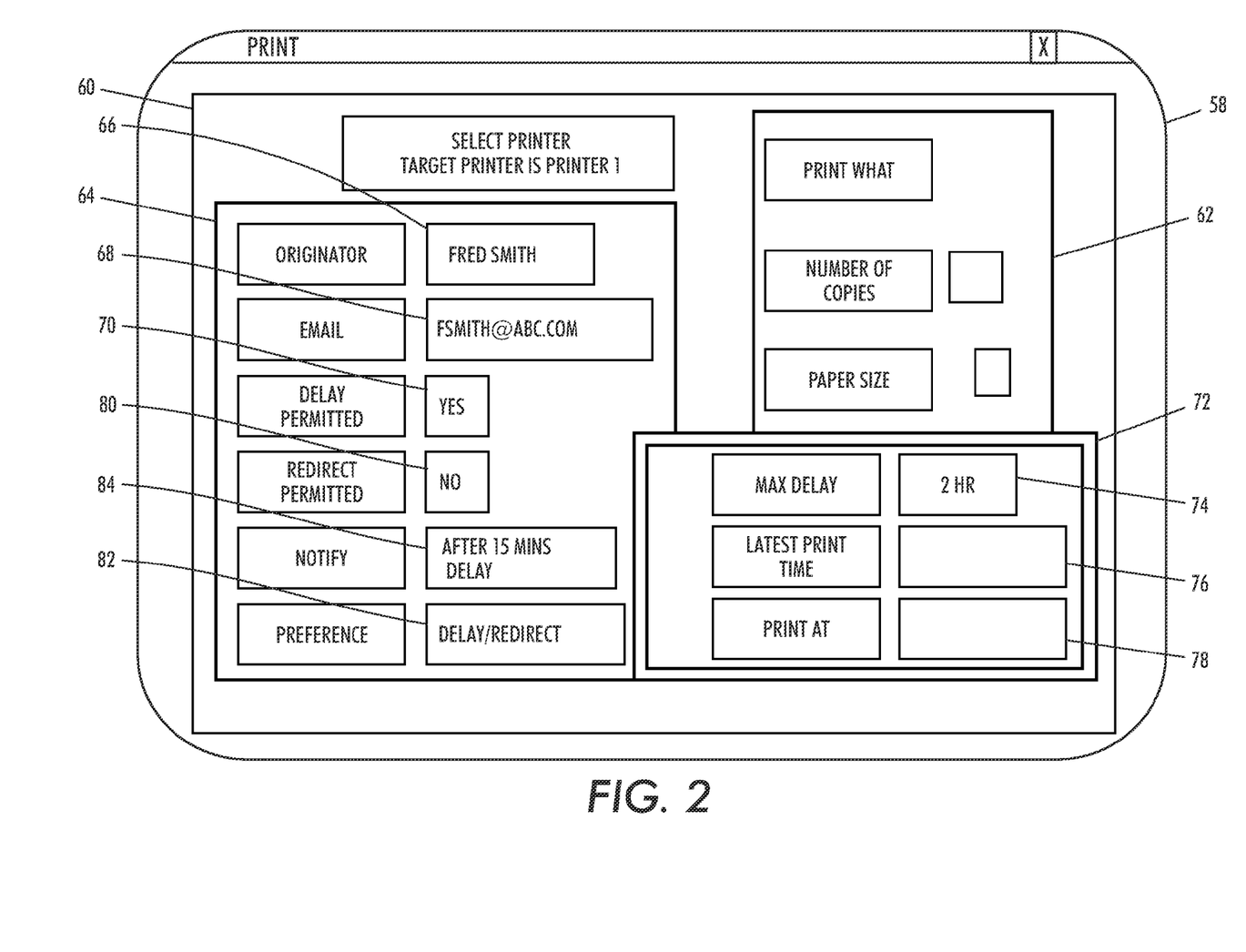
FIG. 2 illustrates an exemplary user interface for selection of printing parameters in accordance with another aspect of the exemplary embodiment.

FIG. 3 illustrates a method of print job management which may be performed with the system of FIGS. 1 and 2. The method begins at S100. At S102, a print job 34 is generated on a workstation 16, 18 and submitted to the print manager 12. In this example, it is assumed that the originating user either by selecting an option on the job ticket or by default, has selected printer 20 as the target printer and that printers 22 and 24 are thus options for redirect printers, if redirection to either or both of these printers is permitted. As will be appreciated, the target and redirection printers may be otherwise selected from the available printers 20, 22, 24.

At S104, each new print job 34 submitted to the print manager 12 is stored in the global print job queue 36.

At S106, the scheduling component 50 examines the print job 34 and processes it in accordance with the job ticket. In particular, the parameters from the print job ticket relating to redirection and delay may be stored in memory 54. Based on the nature of the printing object, the print job parameters, and status of the target printer 20, the scheduling component 50 determines an appropriate action, such as to move the printing object of the print job to the print queue of the target printer 20, move it to the print queue of a redirect printer 22, 24, or place the printing object in a print batch (an intermediate print queue), or leave the print job in the global print queue for later processing. S106 may include three sub-processing steps: User Dialogue (S106A), Job Batch Creation (S106B), and Job Batch Submission (S106C) to printer queues, which generally apply a first-in-first-out (FIFO) processing of print jobs. Further details of these substeps follow.

At S108, the print job 34 is rendered on the respective printer.

The method ends at S110.

Job Batch Creation (S106A)

Figure 5:
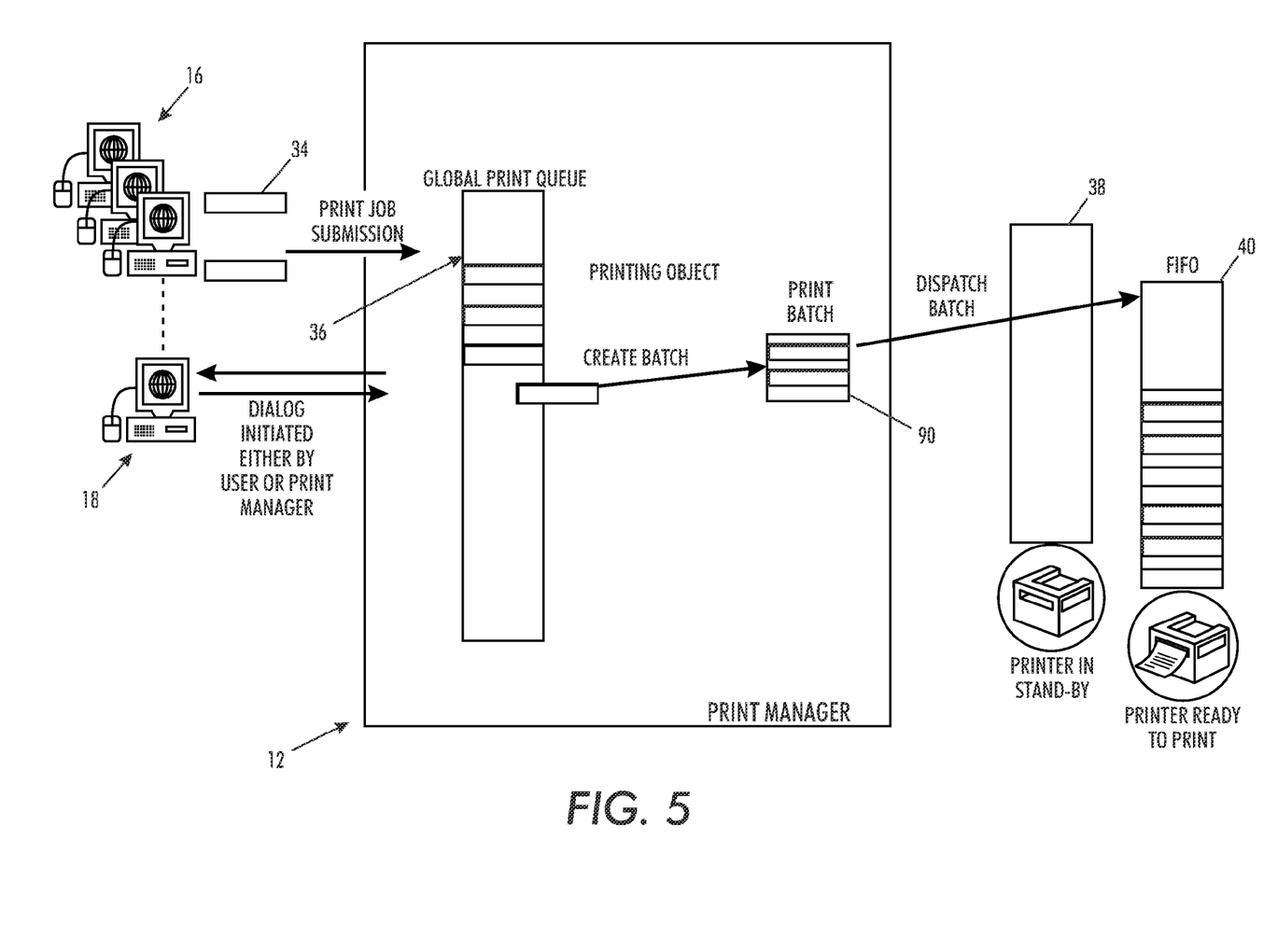
FIG. 5 is a schematic diagram illustrating creation of a print batch from a global print queue.

The print manager 12 continuously inspects the print jobs in its queue. After each complete inspection cycle, Job Batch Creation (S106A) is invoked. Specifically, the print manager generates (at most) one print batch 90 (an intermediate temporary queue comprising one or more print jobs) for each printer. The print batch 90 resides in the print manager 12, e.g., in the print manager's memory 56. Prior to beginning a new inspection cycle, the print batches are submitted to their respective printers, as discussed below and the print batch is deleted from the print manager's memory. Print jobs not sent to a printer/placed in a print batch may remain in the global queue and go through another inspection cycle or cycles.

The following set of rules describes how the print jobs (printing object and/or job ticket) are handled in one exemplary embodiment:

1. If the target printer 22 is in the Ready or Warm-up mode, then the print job is moved to a print batch for the target printer; if no such print batch exists it is created. The insertion order into the print batch may be controlled by job order policies, described below.
   Else
2. Adjust the job modification allowance for delay of the print job so that if the maximum delay period has been reached, further delay allowance is disabled. And
3. Perform an action according to Table 1 below (depending on the printing parameters selected).

TABLE 1

Actions on Printing Objects Targeting Printers in Stand-by Mode

| Allowance: Redirection/ Delay | User Preference | |
|---|---|---|
| | Redirection | Delay |
| Not allowed/ Not allowed | Move printing object to print batch of target printer (as for 1 above) | Move printing object to print batch of target printer (as for 1 above) |
| Not allowed/ Allowed | Delay job (job stays in global print queue) | Delay job (job stays in global print queue) |
| Allowed/ Not allowed | If potential redirection printer is in Ready or Warm-up mode then redirect; Else move | If potential redirection printer is in Ready or Warm-up mode then redirect; Else move |

TABLE 1-continued

Actions on Printing Objects Targeting Printers in Stand-by Mode

| Allowance: Redirection/ Delay | User Preference | |
|---|---|---|
| | Redirection | Delay |
| Allowed/ Allowed | printing object to print batch of target printer (as for 1 above) If potential redirection printer is in Ready or Warm-up mode, then Redirect; Else Delay job (job stays in global print queue) | printing object to print batch of target printer (as for 1 above) Delay job (job stays in global print queue) |

As an example, if a print job 34 allows neither redirection nor delay (first row in Table 1), then regardless of any user preference, it is moved to the print batch of the target printer 20, and, at the end of the inspection cycle sent to the target printer, provoking the target printer to be woken up and the job executed. On the other hand, if a print job allows both redirection and delay (last row in the table) then depending on the user preference, it will either be delayed (last cell in the table) or redirection will be attempted. If the redirection fails, the print job 34 is delayed.

Each print batch 90 is generated from the global print queue 36 and may be stored in memory 54. The order in which jobs 34 are inserted in the batch 90 may be controlled by policies. Default policies may be created by the administrator, but can be redefined by user preferences, in which case, the redefined policies only apply to print jobs initiated by that user. Policies may stipulate that print jobs 34 are organized in print batches 90 in one of the following ways:

Grouped by user (e.g., a group of delayed print jobs for one user are grouped together in one batch)

Sorted by submission time (e.g., a group of delayed print jobs submitted between 8 am and 9 am are grouped together in one batch while print jobs submitted between 9 am and 10 am are grouped in a second batch)

Grouped by paper size and/or quality, or finishing parameters (e.g., a group of print jobs to be printed on standard letter paper are grouped in one batch while a group of print jobs on A4 paper are grouped in a second batch).

Job Batch Submission (S106C)

Job batch submission simply involves sending the jobs 34 in a print batch 90 to its scheduled printer (target or redirection printer).

User Dialogue (S106B)

To facilitate usability and user acceptance, the dialog component 52 of the print manager 12 interacts with the users to allow them to influence the behavior of the process. For example, as illustrated in FIG. 1, a message 86 relating to the print job redirection and/or delay is sent the user's workstation 16, 18 (or to another selected message receiving device, such as a cell phone, PDA, beeper, or the like designated for receiving such messages), from the print manager 12. A first interaction may take place when the user invokes the print operation and specifies printing parameters related to redirection and/or delay that are part of the job ticket. In the exemplary embodiment, these parameters include Target Printer, Job Modification Allowance, Job Modification Automation, Delay Restriction, Redirection Restriction, and Interaction Interval. However, it is to be appreciated that fewer than all these selectable parameters may be provided or that different redirection/delay parameters may be provided. Typically, several of these parameters will have default values to reduce the burden on the user. Optionally, each user is permitted to define default values in a personal profile.

In addition, several other interactions may be invoked by the print manager 12, either through the print client on the user's workstation 16, 18 or optionally through email or other communication systems, such as through SMS (short message service, often referred to as text messages), a web page, or the like.

If the Job Modification Automation parameter is "off", then any action taken on a Printing Object (see Table 1) needs to be confirmed with the user, in particular a print job 34 being delayed and/or a print job being redirected.

When the Interaction Interval for a print job 34 which is delayed expires, a user interaction is initiated by the dialogue component 52, allowing the user to confirm or modify future print job processing.

The user may at any time connect to the print manager 12 to interact with delayed jobs. For example, if a user determines that a delayed print job 34 is needed at an earlier time than originally permitted, or otherwise wishes to modify the printing parameters, the user may initiate a dialogue with the print manager dialogue component 52, to modify the delay parameters. In one embodiment, a user may click an icon for the print client on the workstation 16, 18, which opens the print client. The print client displays the user's job(s) which have been delayed/scheduled for redirection. The user may then click on a "print now" box, which overrides all the delay parameters, or a "modify" box, which may bring up a window similar to the one used in creating the job ticket which allows the user to modify the printing parameters. The print manager 12 then modifies the printing parameters stored in memory 54 in accordance with the user's selection(s).

Figure 4:
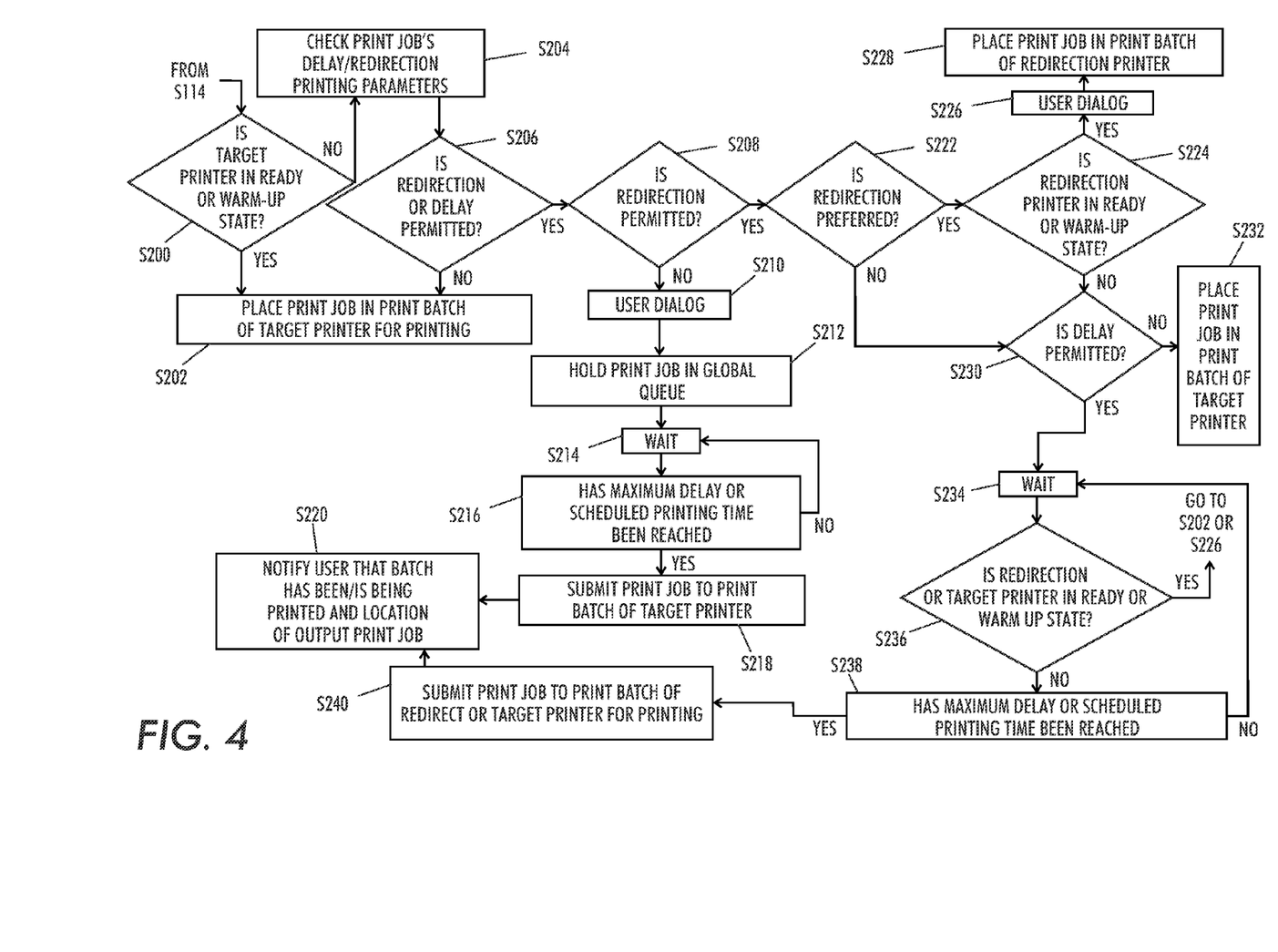
FIG. 4 illustrates automated steps of the method of FIG. 3 in which user-selected printing parameters are considered in print delay and redirection decisions.

FIG. 4 illustrates some of the steps which may take place in S106 of the exemplary method illustrated in FIG. 3. At S200, the scheduling component 50 checks if the target printer 20 is in the ready or warm-up state and if so, places the print job in the job queue of the target printer 20 (S202). If the target printer 20 is not in the ready or warm-up state, the scheduling component 50 checks the print job's delay/redirection parameters (S204).

At S206, a determination is made as to whether redirection and/or delay is permitted. If neither is permitted, at S202, the print job is placed in the print batch of the target printer 20. The print job is sent to the target printer at the completion of the inspection cycle along with any other print jobs in the batch to be printed on an FIFO basis.

If one or both delay and redirection is permitted, at S208, if redirection is not permitted, at S210, a dialogue is conducted with the user to alert the user that printing of the job has been delayed, and at S212, the print job 34 is retained in the global queue 36.

A waiting period (S214) then commences (e.g., until the next inspection cycle).

If at S216, the maximum delay permitted by the job ticket has been reached (factoring in the time required to print the job), the print job batch is placed in a print batch 90 for the target printer 20 (S218). At S220, a dialogue is initiated with the user by the dialogue component. The user is notified that the job is being printed on the target printer 20. The job batch 90 is sent to the target printer 20 to be placed in that printer's job queue for printing in the normal course (usually FIFO).

If at S208, redirection is permitted, and preferred (S222), then at S224, the scheduling component 50 checks to see if the redirection printer(s) is in the ready or warm-up state. If so, at S226, a dialogue with the user may be initiated, and the user is advised that the print job is being redirected, and the identity of the redirection printer 22 or 24 is provided. The user may reject the redirection, in which case the method may return to S208. Otherwise, the print job 34 is placed in a print batch 90 for the redirection printer 22 or 24 (S228) and sent to the redirection printer for printing in the normal course. If at S224, the redirection printer is not in a ready or warm-up state, at S230, if delay is not permitted, then at S232, the job 34 may be placed in a print batch for the target printer 20 and the batch sent to the target printer's queue for printing in the normal course.

If at S230, delay is permitted, a waiting period commences (S234). If after a period of waiting (e.g., at the next inspection cycle), the redirection or target printer is in the ready or warm up state (S236), the print job is placed in the print batch of that printer (i.e., the method proceeds to S202 or S226). If not, and at S240, the maximum delay of scheduled printing time has been reached, the print job is added to the batch 90 of the target printer 20 or a redirection printer 22 or 24 and is submitted to the job queue of that printer (S240), followed by user dialog at S220.

If at S238, the maximum waiting period has not been reached, the method returns to S234.

As will be appreciated, the process may be interrupted at any time by a user-initiated dialogue. It is also contemplated that more complex schemes may be developed, based on the redirection/delay printing parameters.

Additional Features

In the method described, print jobs (i.e., job ticket information and/or printing objects) may be stored in the global queue 36 for a certain period of time, before being executed. This opens up the possibility for a number additional features, which will contribute to user acceptance:

1. Several print objects from the same originator and with compatible job tickets can be grouped together to be performed in print batches 90. The advantage to the users is that all the requested print jobs will be delivered in a single batch 90 at the same time and at the same printer 20, 22, or 24.

2. One environmental-friendly option is to use a single coversheet for all the jobs 34 in a print batch 90, thus eliminating some unnecessary printing.

3. A table of contents may be generated for the entire print batch 90 and used as cover page (optionally involving the addition of page numbers on all pages).

4. It is not uncommon that a user launches a series of print job requests involving the same document, sometimes with only minor modifications. The user may desire that the latest print job request should make the others obsolete. When a multiple submission of the same print job 34 is detected (e.g., from the file name of from an analysis of the content), a dialogue may be invoked with the user to establish whether obsolete printing objects should be removed from the queue, thus avoiding unnecessary printing.

The method illustrated in FIGS. 3 and 4 may be implemented in a computer program product that may be executed on a computer. The computer program product may be a tangible computer-readable recording medium on which a control program is recorded, such as a disk, hard drive, or may be a transmittable carrier wave in which the control program is embodied as a data signal. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, transmission media, such as acoustic or light waves, such as those generated during radio wave and infrared data communications, and the like, or any other medium from which a computer can read and use.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, or PAL, or the like. In general, any device, capable of implementing a finite state machine that is in turn capable of implementing the flowcharts shown in FIGS. 3 and 4, can be used to implement the method for processing print jobs.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for processing print jobs in a network of printers, each of a plurality of the printers having a high operational state and a low operational state, wherein in the low operational state the respective printer is less ready for printing than in the high operational state, less energy being required to be input to the printer for printing to commence in the high operational state than in the low operational state, comprising:

for each of a plurality of print jobs;
receiving a print job to be printed, a job ticket being associated with the print job, the job ticket providing information about the print job that is used to control how the print job is processed, the job ticket designating one of the printers in the network of printers as a target printer for printing the respective print job and including print job parameters related to redirection and delay for the print job, and where the target printer for the print job is in the low operational state:
identifying the print job parameters related to redirection and delay for the print job from the job ticket; and
based on the identified parameters, scheduling the print job for at least one of:
redirection to a redirection printer in the network of printers, where the parameters for redirection permit redirection, and
delay of the print job where the parameters for delay permit a delay,
whereby by scheduling the print job for at least one of the redirection and delay, the likelihood that the print job is printed sequentially with another print job on one of the target printer and the redirection printer without that one printer entering the low operational state between the printing of the print job and the other print job is increased.

2. The method of claim 1, further comprising, for plural print jobs of the plurality of the print jobs for which the print job parameters permit a delay:
generating a print job batch comprising the plural print jobs for sending to a same printer of the network of printers for printing.

3. The method of claim 2, wherein each print job in the plurality of print jobs has an originating user who originates the print job and the print jobs in the print job batch are grouped by originating user, whereby delayed print jobs for a same originating user are scheduled for printing on the same printer.

4. The method of claim 2, further comprising printing the print job batch on the same printer in compliance with maximum delay parameters for the print jobs in the batch.

5. The method of claim 4, wherein each print job in the plurality of print jobs has an originating user who originates the print job, the method further comprising notifying the originating user of one of the plurality of print jobs of a printing time when the print jobs in the print job batch are to be printed or when they have been printed.

6. The method of claim 1, wherein the job ticket includes parameters selected from the group consisting of:
   i) whether a print job is permitted to be delayed, re-directed or both;
   ii) where a print job, as selected in i), may be both delayed and redirected, which is preferred;
   iii) whether a delay or redirection selected in i) requires authorization of a user who originated the print job;
   iv) where, as selected in i), delay is permitted, a time for latest execution;
   v) where, as selected in i), redirection is permitted; restrictions on redirection of the print job;
   v) where, as selected in i), delay is permitted, a maximum time interval for initiating an interaction with a user who originated the print job, when a print job is delayed.

7. The method of claim 1, wherein the high operational state comprises at least one of a ready mode, in which the printer is idle or printing, and a warm-up mode in which the printer is being brought into the ready mode.

8. The method of claim 1, wherein the low operational state comprises at least one stand-by mode from which the printer is capable of being automatically warmed up to the high operational state.

9. The method of claim 1, further comprising, when a print job is scheduled for redirection or delay, initiating a dialogue with a user who originated the print job, to provide redirection or delay information.

10. The method of claim 1, further comprising storing information on a current operational state of each of the plurality of printers, and scheduling printing of print jobs in the plurality of print jobs based on the printing parameters of the associated job tickets of the print jobs of the plurality of print jobs and the stored operational states of the printers.

11. The method of claim 1 further comprising:
   placing print jobs for which the plurality of printers are designated as target printers together in a global print queue; and
   identifying a group of print jobs in the global queue whose print job parameters permit redirection or delay for printing as a batch on the same printer.

12. The method of claim 1, wherein the received print jobs are placed in a global print queue, the print jobs in the global print queue being examined in inspection cycles, and for each inspection cycle, the print jobs are handled according to the following rules:
   a) if the target printer is in the high operational state, then the print job is moved to a print batch for the target printer and if no such print batch exists it is created;
   b) if the target printer is not in the high operational state, then a job modification allowance for delay of the print job is adjusted such that if a maximum delay period has been reached, a further allowance for delay is prevented, the print job being processed, after such adjustment, in accordance with the print job parameters relating to redirection and delay such that,
   i) a print job for which redirection is permitted may be placed in the print job batch of a redirection printer, if the redirection printer is in the high operational state; and
   ii) a print job for which delay is permitted may be retained in the global print queue to be examined in a subsequent inspection cycle, provided the maximum delay period has not been reached.

13. A computer program product comprising a non-transitory recording medium which stores instructions which when executed on a computer, perform the method of claim 1.

14. A printing system which performs the method of claim 1, the system comprising memory which stores instructions for performing the method and a processor capable of implementing the method.

15. A method of generating a job ticket for a print job to be printed comprising:
   providing an option for a user to select at least one print job delay parameter which permits delay of the print job when it is determined that the likelihood that the print job is printed sequentially with another print job on a target printer without the target printer entering a low operational state between the printing of the print job and the other print job is increased;
   providing an option for a user to select at least one redirection parameter which permits redirection of the print job from the target printer to a redirection printer only when the target printer is in the low operational state and it is determined that the likelihood that the print job is printed sequentially with another print job on the redirection printer without that redirection printer entering the low operational state between the printing of the print job and the other print job is increased.

16. The method of claim 15, wherein the print job redirection and delay parameters include parameters selected from the group consisting of:
   i) whether a print job is permitted to be delayed, re-directed or both;
   i) where a print job may be both delayed and redirected, as selected in i), which is preferred by the originating user;
   iii) whether a delay or redirection selected in i) requires authorization of a user who originated the print job;
   iv) where delay is permitted, as selected in i), a time for latest execution;
   v) where redirection is permitted, as selected in i), restrictions on redirection of the print job; and
   vi) where delay is permitted, as selected in i), a maximum time interval for initiating an interaction with a user who originated the print job when a print job is delayed.

17. A printing system comprising:
   a plurality of printers, each having a ready mode and a stand-by mode;
   a print manager which receives print jobs, a job ticket being associated with each print job, the print manager being capable of providing for redirection and for delay of the print jobs to reduce the number of times a particular one of the plurality of printers cycles between the ready mode and the stand-by mode, and, where a target printer, of the plurality of printers, which is designated in the job ticket for printing a print job is in the stand-by mode, the print manager identifies parameters related to redirection and delay for the print job from the job ticket and, based on the identified parameters, schedules the print job for at least one of:
      redirection from the target printer to a redirection printer in the plurality of printers, where the parameters for redirection permit redirection, and delay of the print job where the parameters for delay permit a delay, whereby the likelihood that the print job is printed sequentially with another of the print jobs on one of the target printer and the redirection printer without that one of the target printer and the redirection printer entering an intervening stand-by mode is increased.

18. The printing system of claim 17, wherein the print manager includes a dialogue component for initiating a dialogue with a user who originated the print job, concerning a print job which has been scheduled for at least one of redirection and delay.

19. The printing system of claim 17, further comprising memory, accessible to the print manager which stores a global print job queue, each print job in the global job queue designating one of the plurality of printers in the network as a target printer, whereby print jobs for multiple printers may be stored contemporaneously in the global print job queue.

20. The printing system of claim 17, wherein the print manager is configured for grouping print jobs as a batch and sending the batch to one of the plurality of printers in accordance with the print job parameters of the print jobs in the batch.

21. The method of claim 1, wherein less energy is required to be input to each of the plurality of printer for printing to commence in the high operational state than in the low operational state.

* * * * *